United States Patent
Choi et al.

(10) Patent No.: US 10,782,144 B2
(45) Date of Patent: Sep. 22, 2020

(54) METHOD AND APPARATUS PROVIDING INFORMATION OF AN AUTONOMOUS VEHICLE

(71) Applicant: Samsung Electronics Co., Ltd., Suwon-si (KR)

(72) Inventors: Hee Min Choi, Seoul (KR); Jaewoo Lee, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 119 days.

(21) Appl. No.: 16/044,819

(22) Filed: Jul. 25, 2018

(65) Prior Publication Data

US 2019/0186945 A1    Jun. 20, 2019

(30) Foreign Application Priority Data

Dec. 14, 2017    (KR) .................. 10-2017-0172066

(51) Int. Cl.
| | |
|---|---|
| *G01C 21/36* | (2006.01) |
| *G06K 9/00* | (2006.01) |
| *G05D 1/00* | (2006.01) |
| *B60R 1/00* | (2006.01) |

(52) U.S. Cl.
CPC ............ *G01C 21/3667* (2013.01); *B60R 1/00* (2013.01); *G01C 21/3697* (2013.01); *G05D 1/0088* (2013.01); *G06K 9/00791* (2013.01); *B60R 2300/301* (2013.01); *B60R 2300/302* (2013.01); *B60R 2300/50* (2013.01); *B60R 2300/8086* (2013.01); *G05D 2201/0213* (2013.01)

(58) Field of Classification Search
CPC ............ G01C 21/3667; G01C 21/3697; G06K 9/00791; G05D 1/0088; G05D 2201/0213; B60R 1/00; B60R 2300/50; B60R 2300/8086; B60R 2300/301; B60R 2300/302
See application file for complete search history.

(56) References Cited

U.S. PATENT DOCUMENTS

2003/0030554 A1    2/2003  Yavitz
2015/0077237 A1*   3/2015  Chou .................... G06F 3/0483
                                                          340/439
(Continued)

FOREIGN PATENT DOCUMENTS

JP    2004077281    *  3/2004
JP    2009-147851 A    7/2009
(Continued)

OTHER PUBLICATIONS

Machine Translation JP 2004-077281 (Year: 2004).*

*Primary Examiner* — Anne Marie Antonucci
(74) *Attorney, Agent, or Firm* — Sughrue Mion, PLLC

(57) ABSTRACT

An autonomous vehicle and method of providing driving information of an autonomous vehicle, the method includes acquiring outside situation data via a sensor in the autonomous vehicle, generating, based on the acquired outside situation data, a local map comprising the autonomous vehicle, one or more external vehicles within a threshold distance from the autonomous vehicle, and a road on which the autonomous vehicle is travelling, and displaying the generated local map on a display of the autonomous vehicle.

16 Claims, 9 Drawing Sheets

(56) References Cited

U.S. PATENT DOCUMENTS

| | | | |
|---|---|---|---|
| 2015/0336502 A1* | 11/2015 | Hillis | G06F 3/017 |
| | | | 701/23 |
| 2017/0091577 A1 | 3/2017 | Lee et al. | |
| 2018/0058879 A1* | 3/2018 | Tayama | G09B 29/00 |
| 2018/0149491 A1* | 5/2018 | Tayama | B60R 21/00 |
| 2018/0264941 A1* | 9/2018 | Sato | B60Q 1/503 |

FOREIGN PATENT DOCUMENTS

| | | |
|---|---|---|
| KR | 10-2008-0010728 A | 1/2008 |
| KR | 10-2010-0099633 A | 9/2010 |

\* cited by examiner

METHOD AND APPARATUS PROVIDING INFORMATION OF AN AUTONOMOUS VEHICLE

CROSS-REFERENCE TO RELATED APPLICATION

This application claims the benefit under 35 USC § 119(a) of Korean Patent Application No. 10-2017-0172066 filed on Dec. 14, 2017 in the Korean Intellectual Property Office, the entire disclosure of which is incorporated herein by reference for all purposes.

BACKGROUND

1. Field

The following description relates to a method and apparatus for providing driving information of an autonomous vehicle to an external vehicle.

2. Description of Related Art

A current vehicle information providing method may deliver visual information acquired by a driver. When a large vehicle is travelling in front of the driver, it may be difficult for the driver to acquire information regarding road conditions ahead since the large vehicle may obscure a front view of the driver.

In addition, the currently used vehicle information providing method may only provide driving information of a host vehicle. Thus, driving information of an external vehicle travelling in close proximity to the host vehicle may not be provided.

Also, in the currently used vehicle information providing method, it may be difficult to distinguish an indication of a vehicle to turn left or right from an indication a vehicle to make U-turn.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a processor implemented method of providing driving information of an autonomous vehicle includes acquiring outside situation data via a sensor in the autonomous vehicle, generating, based on the acquired outside situation data, a local map comprising the autonomous vehicle, one or more external vehicles within a threshold distance from the autonomous vehicle, and a road on which the autonomous vehicle is travelling, and displaying the generated local map on a display of the autonomous vehicle.

The generated local map may be displayed to be visible to the one or more external vehicles.

The displaying of the generated local map may include additionally displaying event information corresponding to any one or any combination of a change in direction of the one or more external vehicles and the autonomous vehicle, and a current speed of the one or more external vehicles and the autonomous vehicle.

The event information may be mapped to any one or any combination of a digit, a character, and a symbol to be displayed.

The display may be provided in at least a portion of a rear window of the autonomous vehicle.

The display may be additionally provided in at least a portion of a windshield of the autonomous vehicle.

At least a portion of the display provided in the portion of the windshield that faces a passenger seat of the autonomous vehicle.

The sensor may include any one or any combination of a camera, a radio detection and ranging (RADAR), a light detection and ranging (LIDAR), an ultrasonic sensor, and a global positioning system (GPS) sensor.

In a general aspect, an autonomous vehicle includes a display, a sensor configured to acquire outside situation data, and a processor configured to generate, based on the acquired outside situation data, a local map comprising the autonomous vehicle, one or more external vehicles within a threshold distance from the autonomous vehicle, and a road on which the autonomous vehicle is travelling, and display the generated local map on the display of the autonomous vehicle.

The generated local map may be displayed to be visible to the one or more external vehicles.

The processor may be configured to control the autonomous vehicle to additionally display event information corresponding to any one or any combination of a change in direction of the one or more external vehicles and the autonomous vehicle, and a current speed of the one or more external vehicles and the autonomous vehicle.

The event information may be mapped to any one or any combination of a digit, a character, and a symbol to be displayed.

The display may be provided in at least a portion of a rear window of the autonomous vehicle.

The display may be additionally provided in at least a portion of a windshield of the autonomous vehicle.

At least a portion of the display may be provided in the portion of the windshield that faces a passenger seat.

The sensor may include any one or any combination of a camera, a radio detection and ranging (RADAR), a light detection and ranging (LIDAR), an ultrasonic sensor, and a global positioning system (GPS) sensor.

In a general aspect, an autonomous vehicle includes a display, a sensor configured to acquire outside situation data, a processor configured to generate, based on the acquired outside situation data, a map comprising the autonomous vehicle and one or more external vehicles within a predetermined distance from the autonomous vehicle, and display the generated map to the one or more external vehicles via the display.

The display may be located in one or more of a windshield, a side window, and a rear window of the autonomous vehicle.

The display may be configured to display event information related to a change in direction of the autonomous vehicle in one or more of a symbol, a digit, and a character.

Other features and aspects will be apparent from the following detailed description, the drawings, and the claims.

Figure 1:
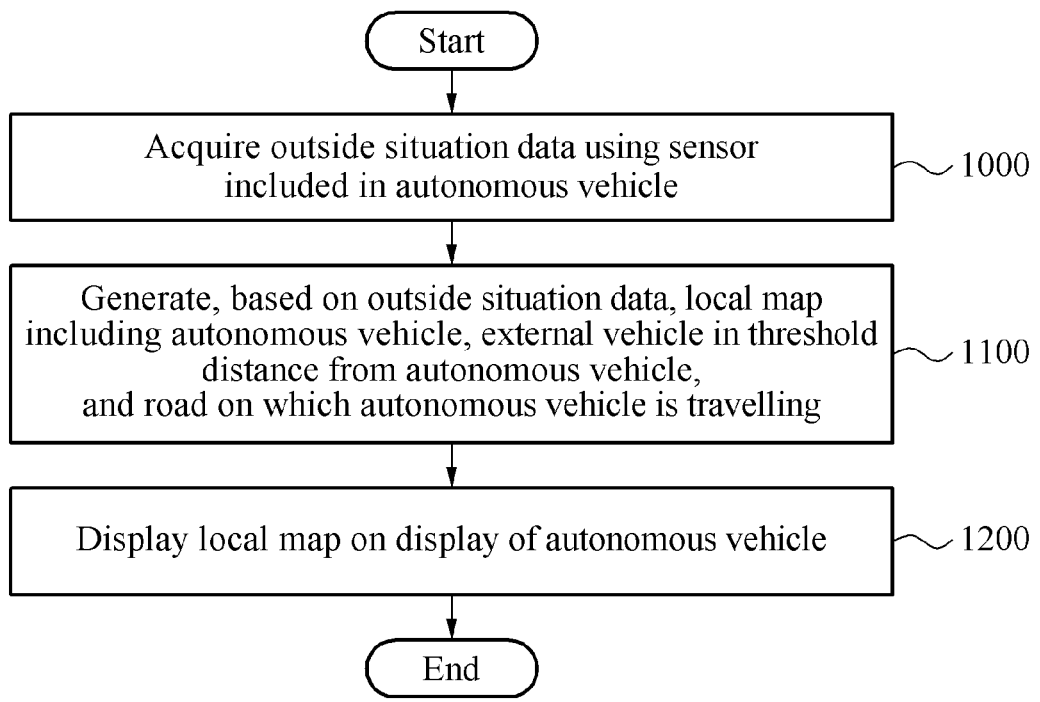
FIG. 1 illustrates an example of a method of providing driving information of an autonomous vehicle.

Throughout the drawings and the detailed description, unless otherwise described or provided, the same drawing reference numerals refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Unless otherwise defined, all terms, including technical and scientific terms, used herein have the same meaning as commonly understood by one of ordinary skill in the art to which this disclosure pertains, and in view of the disclosure of this application. Terms, such as those defined in commonly used dictionaries, are to be interpreted as having a meaning that is consistent with their meaning in the context of the relevant art, and in view of the disclosure of this application, and are not to be interpreted in an idealized or overly formal sense unless expressly so defined herein.

A typical method of providing driving information of a vehicle is limited to on the view of a driver and thus, it may be difficult to acquire the conditions of a roadway when a large vehicle is in front of the driver, and therefore may impede the view of the driver. The typical method provides signal information indicating that a host vehicle is about to turn in a left or right direction. However, the typical method may not provide information that the host vehicle is about to make a U-turn. Thus, a driver of an external vehicle travelling in front of or behind the host vehicle may not accurately predict such a movement of the host vehicle.

Figure 8:
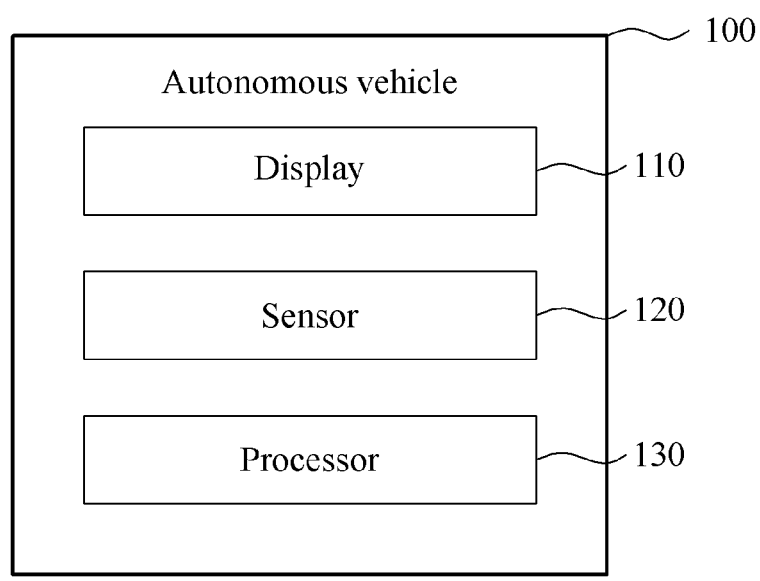
FIG. 8 illustrates an example of an autonomous vehicle.

As illustrated in FIG. 8 below, an autonomous vehicle 100 may display a local map based on outside situation information acquired via a sensor 120, thereby providing accurate driving information of the autonomous vehicle 100 to a driver of an external vehicle, for example, an external vehicle in front of, or behind, the autonomous vehicle 100. In a non-limiting example, the outside situation information may be displayed to a driver of the external vehicle via a display that is included in or on the autonomous vehicle 100.

Figure 2:
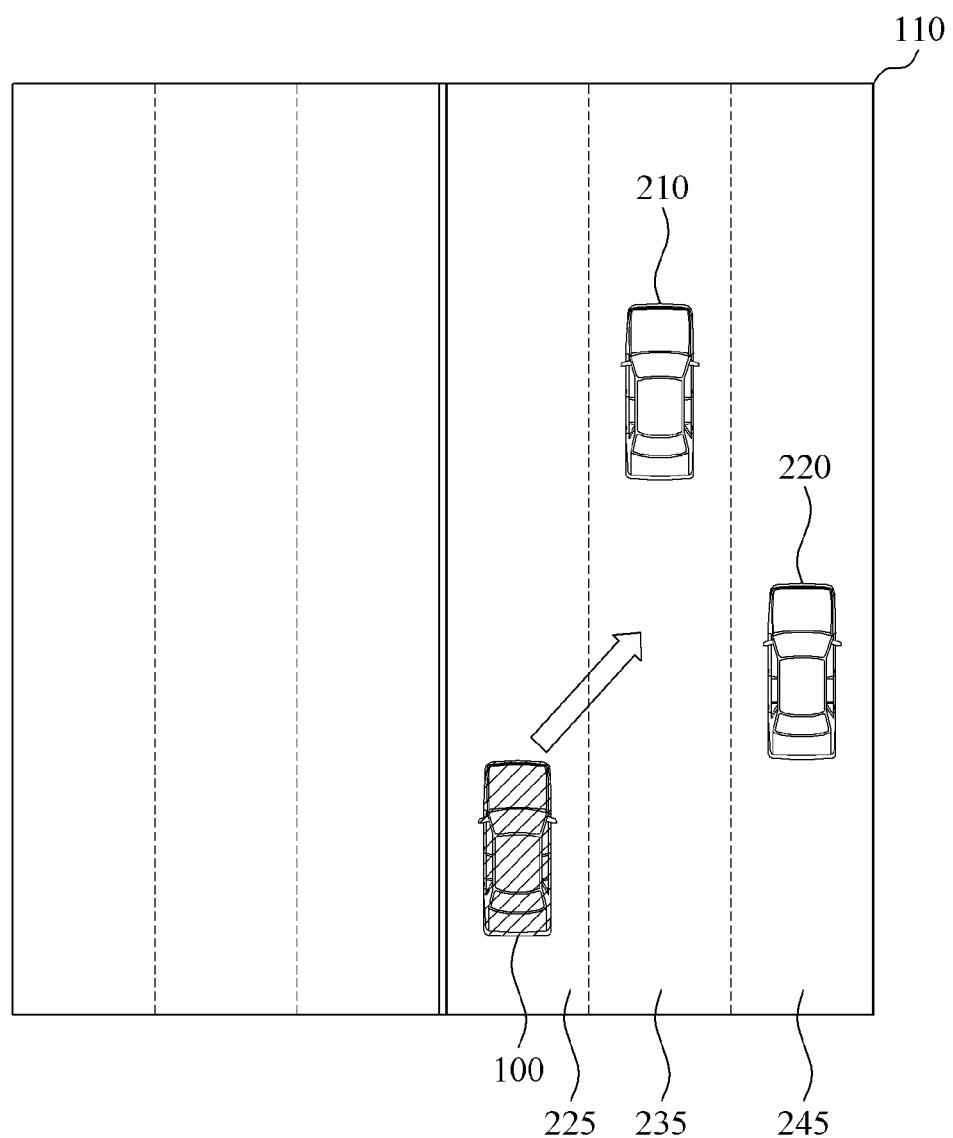
FIG. 2 illustrates an example of a local map.

FIG. 1 illustrates an example of a method of providing driving information of an autonomous vehicle 100 (FIG. 2). The operations in FIG. 1 may be performed in the sequence and manner as shown, although the order of some operations may be changed or some of the operations omitted without departing from the spirit and scope of the illustrative examples described. Many of the operations shown in FIG. 1 may be performed in parallel or concurrently. One or more blocks of FIG. 1, and combinations of the blocks, can be implemented by special purpose hardware-based computer that perform the specified functions, or combinations of special purpose hardware and computer instructions.

In addition to the description of FIG. 1 below, the descriptions of FIGS. 2-8 are also applicable to FIG. 1, and are incorporated herein by reference. Thus, the above description may not be repeated here.

In the example of FIG. 1, in operation 1000, the autonomous vehicle 100 may acquire outside situation data with a sensor 120 (FIG. 8) included in the autonomous vehicle 100 (FIG. 2).

Outside situation data may be data used to determine a particular situation outside of the autonomous vehicle 100. The outside situation data may include, for example, a change in location of the autonomous vehicle 100, information regarding whether an external vehicle is located within a threshold distance from the autonomous vehicle 100, and a change in a direction or a speed of the external vehicle. The external vehicle may be a vehicle in close proximity to the autonomous vehicle 100.

The autonomous vehicle 100 may include, but is not limited to, any one or any combination of a camera, a radio detection and ranging (RADAR), a light detection and ranging (LIDAR), an ultrasonic sensor, and a global positioning system (GPS) sensor. The RADAR is a device that emits an electromagnetic wave (for example, a microwave with a wavelength of 10 to 100 centimeters (cm)) to a target object, and receives the electromagnetic wave reflected from the target object to detect a direction to the target object or a distance from the target object. The RADAR is used to detect a target object in a long range. The LIDAR is a device that measures a distance from a target object using laser reflection light. The LIDAR maps the target object to 3D (three-dimensional) image (e.g. stereo image). The ultrasonic sensor is a device that emits an ultrasonic wave to a target object and detects a direction to the target object, or a distance from the target object using the ultrasonic wave reflected from the target object. The ultrasonic sensor is used to detect a target object in a short range. The GPS sensor is a device that receives signals transmitted from GPS satellites to acquire a current location of a user. The autonomous vehicle 100 acquires the outside situation data using any one or any combination of the aforementioned sensors In operation 1100, the autonomous vehicle 100 generates, based on the outside situation data, a local map including the autonomous vehicle 100, one or more external vehicles located within a threshold distance from the autonomous vehicle 100, and a road on which the autonomous vehicle 100 is travelling.

The local map may include one or more external vehicles that are located within a threshold distance of the autonomous vehicle 100, for example, one or more external vehicles that are located within 100 meters (m) from the autonomous vehicle 100. The threshold distance may vary based on, for example, a speed, a location, and a driving direction of the autonomous vehicle 100. For example, when the speed of the autonomous vehicle 100 increases, a range for acquiring a driving route for one or more external vehicles may also increase. Accordingly, as the speed of the autonomous vehicle 100 increases, the threshold distance for recognizing the one or more external vehicles increases. Also, as the speed of the autonomous vehicle 100 decreases, the threshold distance for recognizing the one or more external vehicles within a threshold distance of the autonomous vehicle 100 may also decrease.

In operation 1200, the autonomous vehicle 100 may display the local map on a display 110 (FIG. 2) of the autonomous vehicle 100.

The autonomous vehicle 100 may display the local map in a form of a top view or an aerial view. This is only an example, and the autonomous vehicle may also display the local map in a ground level view. The autonomous vehicle 100 may display event information corresponding to any one or any combination of direction changes and speeds of the external vehicle and the autonomous vehicle 100 in addition to the local map.

FIGS. 2 through 5 illustrate examples of a local map.

FIG. 2 illustrates an example of the display 110 displaying a local map including the autonomous vehicle 100, at least one external vehicle 210 and 220, and one or more lanes 225, 235, 245 on a road. The display 110 may also display event information corresponding to any one, or any combination of, changes in direction and speeds of the at least one external vehicle 210 and 220 and the autonomous vehicle 100 by mapping the event information to a symbol (for example, an arrow, etc.). The event information may be mapped to any one or any combination of a digit, a character, and a symbol to be displayed. As illustrated in FIG. 2, the display 110 displays event information indicating that the autonomous vehicle 100 travelling in a first lane 225 is to change a lane to a second land 235 and travel behind the external vehicle 210 in the second lane 235, by mapping the event information to the arrow.

Referring to FIG. 2, the autonomous vehicle 100 acquires, via the sensor 120 (FIG. 8), outside situation data indicating that the autonomous vehicle 100 is travelling in a first lane 225, external vehicles 210 and 220 are respectively present in a second lane 235 and a third lane 245 of a road, and travelling in the same direction as the autonomous vehicle 100, the external vehicle 210 in the second lane 235 is the foremost vehicle based on a longitudinal direction, the external vehicle 220 is travelling behind the external vehicle 210 in the third lane 245, and the autonomous vehicle 100 is travelling behind the external vehicle 210 in the first lane 225, and displays the outside situation data on the local map.

The autonomous vehicle 100 is displayed in such a manner to be visually distinguished from an external vehicle 210 and 220 using, for example, a color, a shade, a shape, an indicator, a flash, characters, a symbol, and a figure, but not limited thereto. As illustrated in FIG. 2, the display 110 may display the autonomous vehicle 100 in a manner that the autonomous vehicle 100 may be visually distinguished from the external vehicles 210 and 220 based on a visually distinguishing color or shade.

Figure 3:
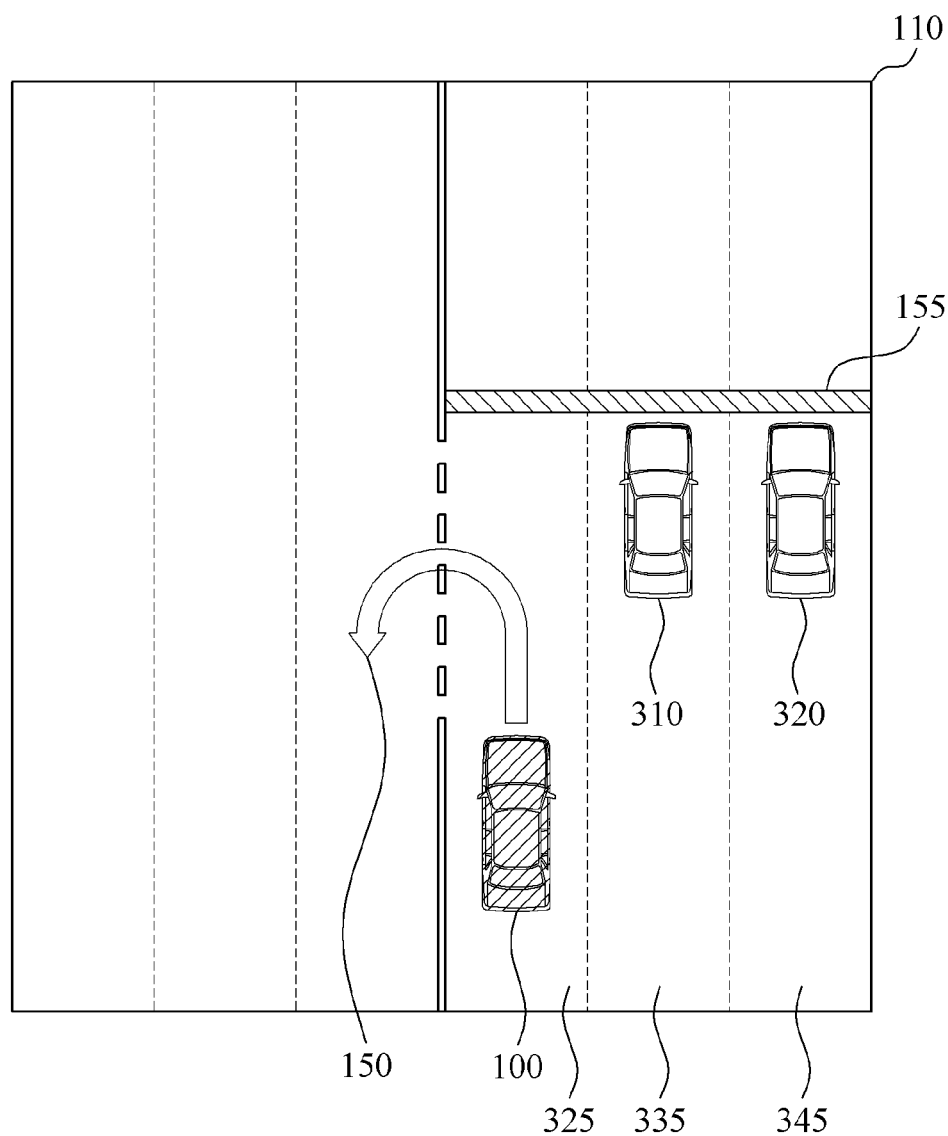
FIG. 3 illustrates an example of a local map.

FIG. 3 illustrates an example of a display 110 displaying a local map including the autonomous vehicle 100, an external vehicle 310 and 320, and a road. The display 110 further displays event information indicating that the autonomous vehicle 100 travelling in a first lane 325 is to make U-turn before a stop line by mapping the U-turn event information to an arrow such that the autonomous vehicle 100 drives along a path set based on navigation information.

Referring to FIG. 3, the autonomous vehicle 100 acquires, using the sensor 120, outside situation data indicating that the autonomous vehicle 100 is travelling in a first lane 325, the stop line 155 is in front of the autonomous vehicle 100, and an external vehicle 310 in a second lane 335, and an external vehicle 320 in a third lane 345 are stopped before the stop line 155 of a road, and facing the same direction as the autonomous vehicle 100, and displays the outside situation data on the local map.

In a typical driving information providing approach, even when a driver of a host vehicle turns on a left-turn indicator signal of the host vehicle to make U-turn, it may be difficult for a driver of another vehicle in front of or behind the host vehicle to accurately understand whether the left-turn indicator lamp indicates a left turn or a U-turn.

In the example of FIG. 3, the autonomous vehicle 100 displays a U-turn sign 150 on the display 110 using a U-type figure such that a driver of an external vehicle may visually ascertain that the autonomous vehicle 100 will make a U-turn.

Figure 4:
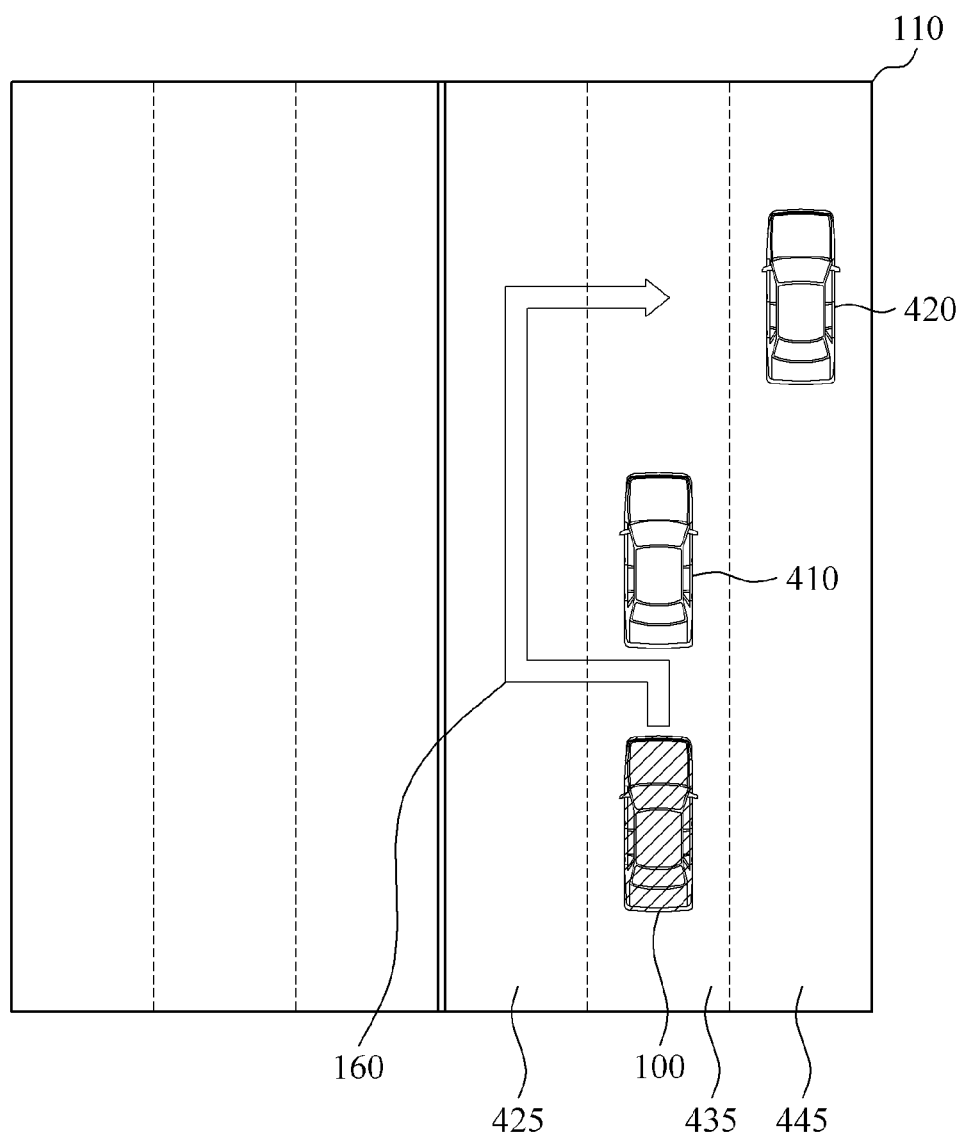
FIG. 4 illustrates an example of a local map.

FIG. 4 illustrates an example of a display 110 displaying a local map including the autonomous vehicle 100, at least one external vehicle 410 and 420, and a road. The display 110 may also display event information indicating that the autonomous vehicle 100, which is travelling in a second lane 435 will pass an external vehicle 410 in the second lane 435 via a first lane 425 by mapping the event information to an arrow 160 to prevent a delay in time required to reach a destination.

Referring to FIG. 4, the autonomous vehicle 100 acquires, via the sensor 120, outside situation data indicating that the autonomous vehicle 100 is travelling in a second lane 435, external vehicles 410 and 420 are respectively present in the second lane 435 and a third lane 445 of a road, and facing a same direction as the autonomous vehicle 100. The external vehicle 420 in the third lane 445 is the foremost vehicle based on a longitudinal direction, the external vehicle 410 is travelling behind the external vehicle 420 in the second lane 435, and the autonomous vehicle 100 is travelling behind the external vehicle 410 in the second lane 435. The autonomous vehicle 100 displays the outside situation data on the local map.

In a typical driving information providing method, even when a driver of a host vehicle turns on a turn indicator signal of the host vehicle to indicate a desire to pass an external vehicle, it may be difficult for a driver of the external vehicle in front of or behind the host vehicle to accurately understand whether the turn indicator lamp indicates a lane change or a desire to pass the external vehicle.

In the example of FIG. 4, the autonomous vehicle 100 may display a passing route of the autonomous vehicle 100 on the display 110 with a figure 160 such that a driver of an external vehicle may accurately understand that the autonomous vehicle 100 intends to change lanes to pass a vehicle in front of the autonomous vehicle 100 in order to adjust the time required to reach the destination.

Also, in the typical driving information providing method, when a large vehicle such as a truck or a bus is in front of a host vehicle, it may be difficult for a driver of the host vehicle to acquire event information on an event occurring in front of the vehicle.

As illustrated in FIG. 4, when driving information is displayed on the display 110, a driver an external vehicle 410, 420 behind the autonomous vehicle 100 acquires information indicating that only one external vehicle is present in a threshold distance in the second lane 435 in which the autonomous vehicle 100 is travelling.

Figure 5:
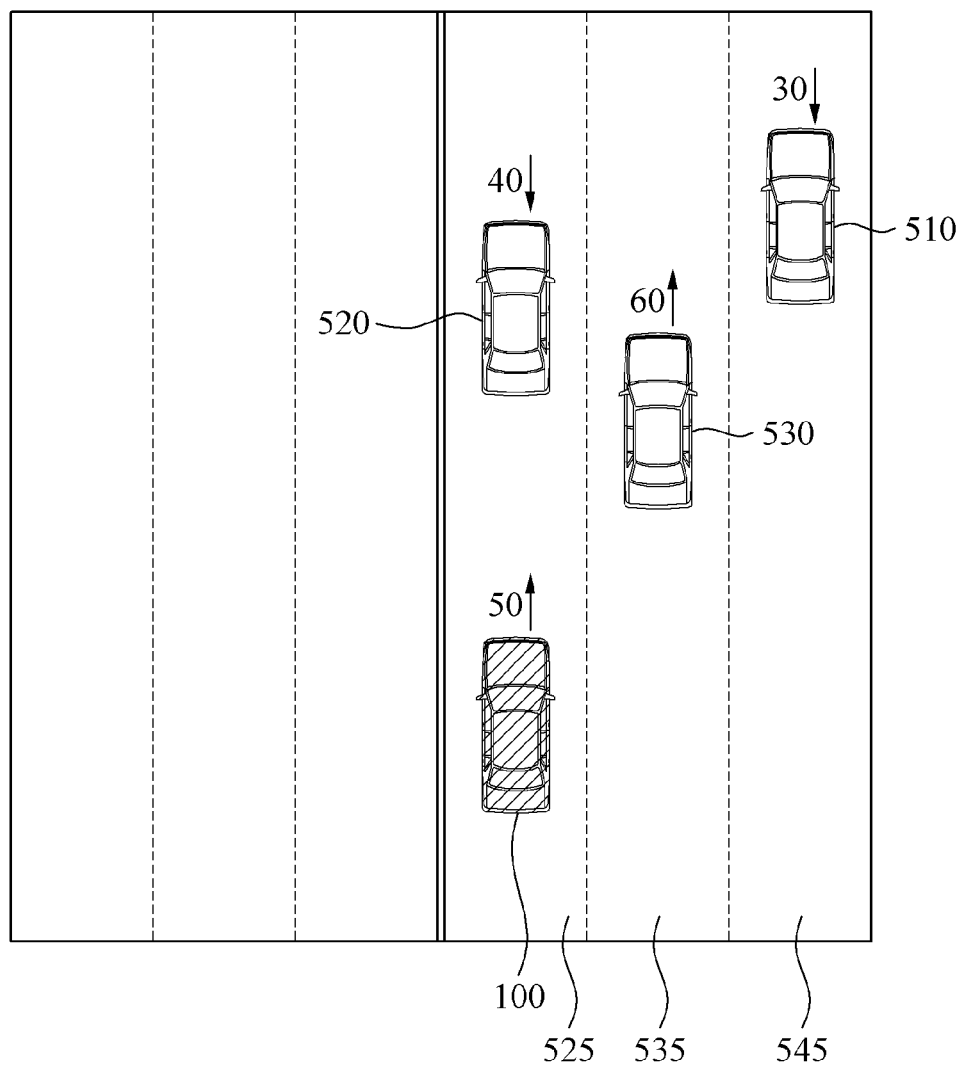
FIG. 5 illustrates an example of a local map.

FIG. 5 illustrates an example of the display 110 displaying a local map including the autonomous vehicle 100, external vehicles 510, 520, 530, and a road. The display 110 further displays current speeds and speed changes of the autonomous vehicle 100 and at least one external vehicle.

Referring to FIG. 5, the autonomous vehicle 100 acquires, via the sensor 120, outside situation data indicating that the autonomous vehicle 100 is travelling in a first lane 525, external vehicles 510, 520, and 530 are respectively travelling in a third lane 545, a first lane 525, and a second lane 535 of a road in the same direction as the autonomous vehicle 100. The external vehicle 510 in the third lane 545 is the foremost vehicle based on a longitudinal direction, the external vehicle 520 is travelling behind the external vehicle 510 in the first lane 525, the external vehicle 530 is travelling behind the external vehicle 520 in the second lane 535, and the autonomous vehicle 100 is travelling behind the external vehicle 530 in the first lane 525, and displays the outside situation data on the local map. The autonomous vehicle 100 also acquires outside situation data associated with an increase or decrease in driving speed and a current driving speed of each of the external vehicles 510, 520, and 530.

The display 110 displays event information indicating that the external vehicle 510 is decelerating, the current driving speed of the external vehicle 510 is 30 kilometers per hour (km/h), the external vehicle 520 is decelerating, the current driving speed of the external vehicle 520 is 40 km/h, the external vehicle 530 is accelerating, the current driving speed of the external vehicle 530 is 60 km/h, the autonomous vehicle 100 is accelerating, and the current driving speed of the autonomous vehicle 100 is 50 km/h by mapping the event information to digits or symbols, for example, arrows "↑" and "↓".

In the typical driving information providing method, it may be difficult for a driver of a host vehicle to accurately anticipate a driving speed and a speed change of external vehicle travelling on the same road.

In the example of FIG. 5, the autonomous vehicle 100 displays current speed information and speed change information of the autonomous vehicle 100 and at least one external vehicle on the display 110 using digits or a figure such that a driver of the external vehicle may easily predict driving routes and driving speeds of a plurality of vehicles travelling on the same road, and the driver may adjust a speed of the external vehicle according to the displayed information.

Although not shown, the display 110 may display a traffic condition of the road on which the autonomous vehicle 100 is travelling based on information acquired via the sensor 120.

In a non-limiting example, the autonomous vehicle 100 may display, on the display 110, road information, for example, smooth traffic, partial congestion, and accident occurrence based on information acquired from a GPS sensor.

In an example, the autonomous vehicle 100 may display a degree of traffic congestion determined based on a number of external vehicles and a threshold number of vehicles, on the display 110. When the number of external vehicles in a threshold distance, for example, 100 m from the autonomous vehicle 100 is less than or equal to 15, the autonomous vehicle 100 may determine that a traffic condition is smooth. When the number of external vehicles in the threshold distance is between 15 and 30, the autonomous vehicle 100 may determine that a traffic condition is partially congested. When the number of external vehicles in the threshold distance exceeds 30, the autonomous vehicle 100 may determine that a traffic condition is congested.

In an example, the autonomous vehicle 100 may display traffic condition information determined based on determined speeds of external vehicles and a threshold speed on the display 110. When the speeds of the external vehicles are less than the threshold speed, the autonomous vehicle 100 may determine that a traffic condition is congested.

In an example, the autonomous vehicle 100 may display traffic condition information that is determined based on speed changes of external vehicles on the display 110. When speeds of the external vehicles are increased by at least a threshold speed in a threshold time, the autonomous vehicle 100 may determine that a traffic condition is changed from "congested" to "smooth", or a stop signal of an intersection is changed to a passing signal. When the speeds of the external vehicles are reduced by at least the threshold speed in the threshold time, the autonomous vehicle 100 may determine that a traffic condition is changed from "smooth" to "congested", or the passing signal of the intersection is changed to the stop signal.

Figure 6A:
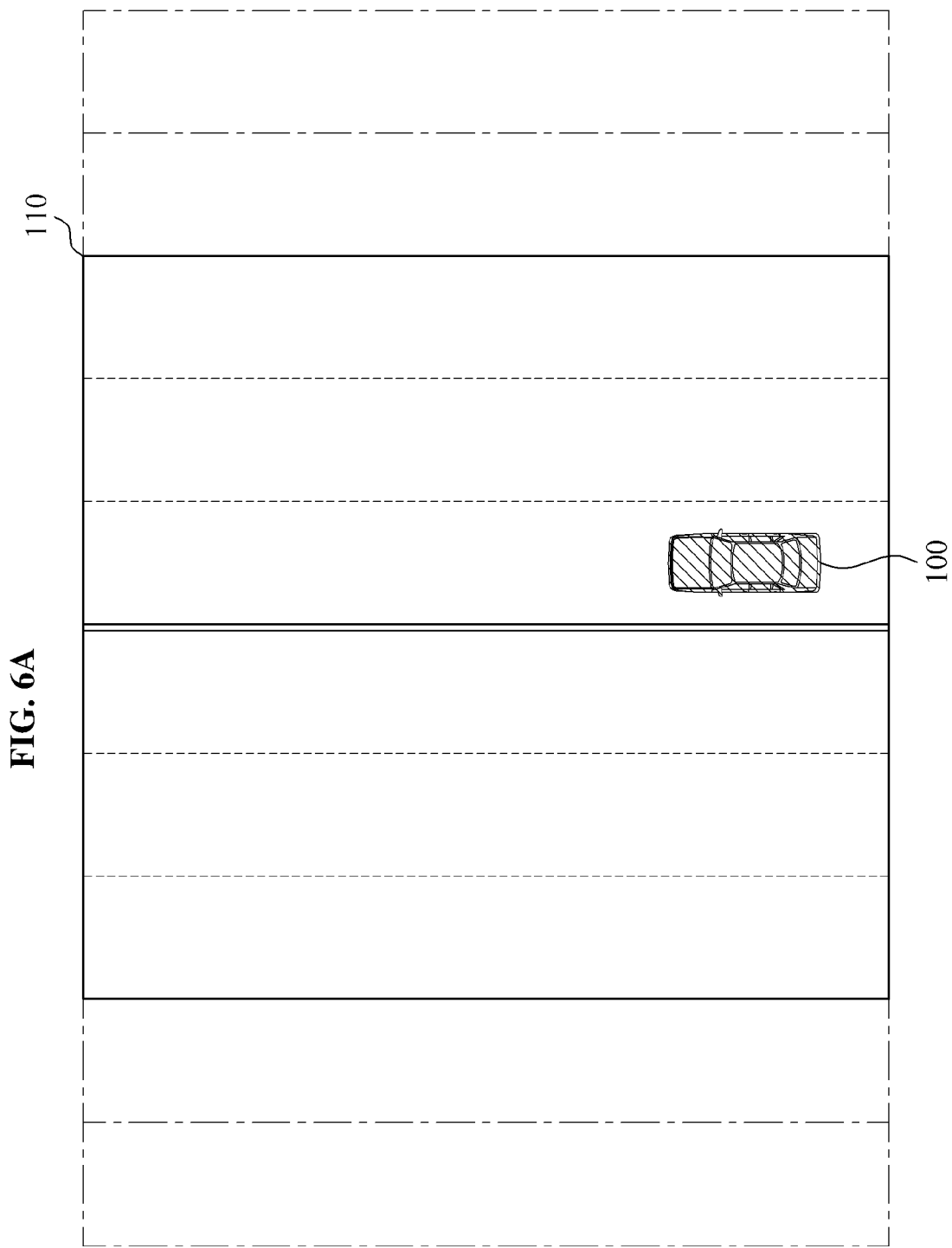
FIGS. 6A and 6B illustrate examples of auto-focusing on an autonomous vehicle.
Figure 6B:
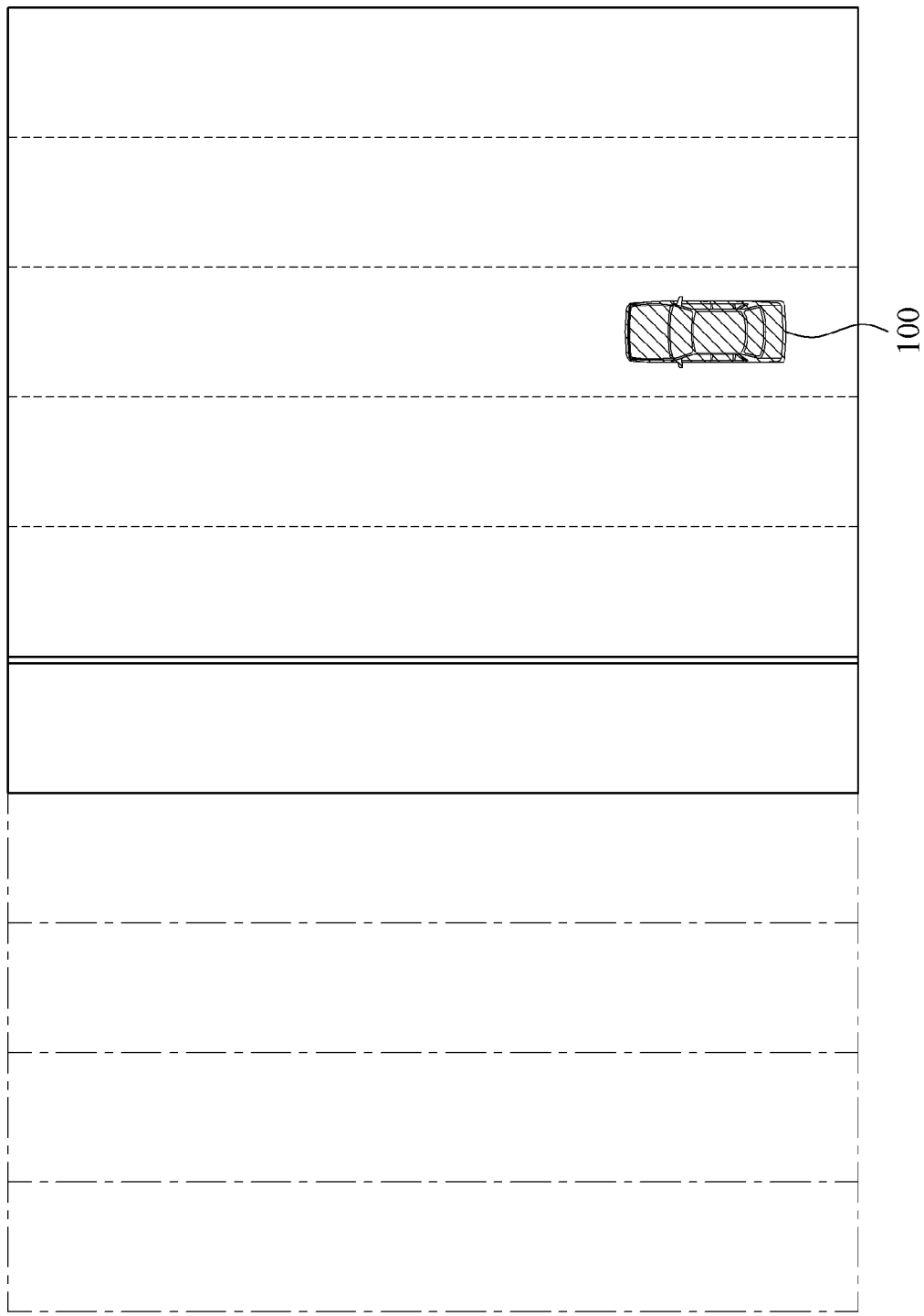

FIGS. 6A and 6B illustrate examples of auto-focusing on an autonomous vehicle.

When a road includes a plurality of lanes, a movement of an external vehicle travelling in a proximate lane to the autonomous vehicle 100 is relatively important in comparison to a movement of an external vehicle travelling in a lane farther from the autonomous vehicle 100. The display 110 may display a local map generated through an auto-focusing process such that a lane of the autonomous vehicle 100 is represented at a portion, for example, a center of the local map without change irrespective of a change in location of the autonomous vehicle 100.

Referring to FIG. 6A, the autonomous vehicle 100 may travel in a first lane in a specific direction of a road including, for example, five lanes in a first direction and five lanes in a second direction. The display 110 may display the autonomous vehicle 100 and the first lane including the autonomous vehicle 100 at a center of a local map. In this example, the display 110 may not display information on two lanes in each of the directions beyond a predetermined distance as indicated by dash-dot lines in a left portion and a right portion of FIG. 6A.

Referring to FIG. 6B, the autonomous vehicle 100 travels in a third lane in one direction of a road including, for example, five lanes in a first direction and five lanes in a second direction. The display 110 may display the autonomous vehicle 100 and the third lane including the autonomous vehicle 100 at a center of a local map. In this example, the display 110 may not display information on four lanes in the second direction beyond a predetermined distance as indicated by dash-dot lines in a left portion of FIG. 6B As illustrated in FIGS. 6A and 6B, the autonomous vehicle 100 is auto-focused such that information on, for example, three lanes for each of the directions including a lane in which the autonomous vehicle 100 is travelling in the predetermined distance is displayed on the local map excluding information beyond the predetermined distance. The display 110 may therefore provide information pertaining to road conditions within a predetermined distance from the autonomous vehicle 100 as priority information, which has a relatively high importance.

Figure 7:
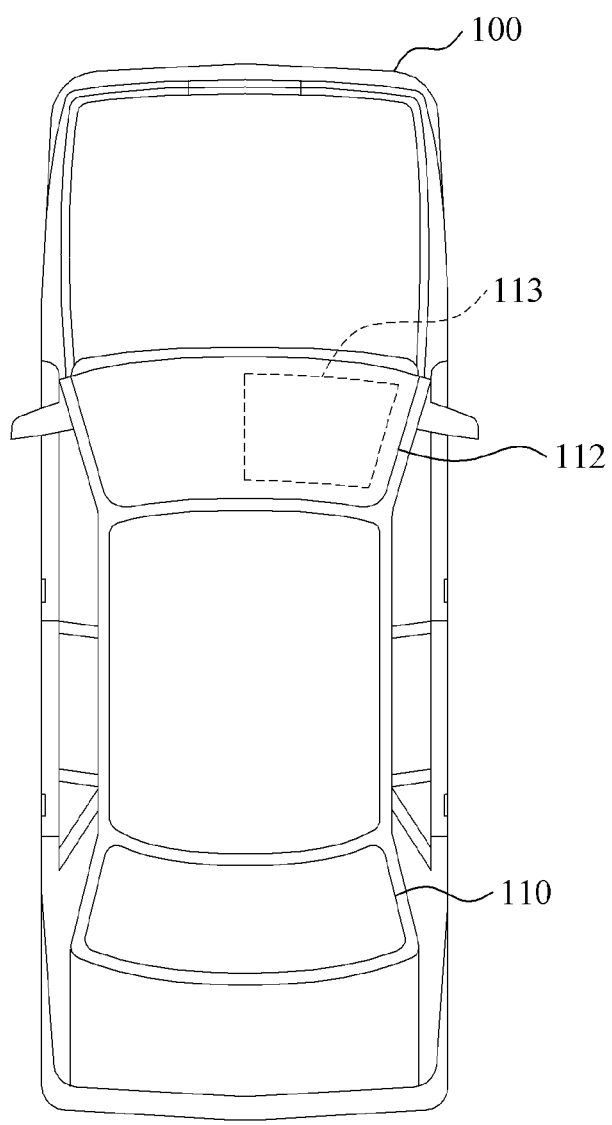
FIG. 7 illustrates an example of an autonomous vehicle and a display.

FIG. 7 illustrates an example of the autonomous vehicle 100 and the display 110.

The display 110 may be a portion or segment of the autonomous vehicle that may display a local map generated by a processor 130 (FIG. 8). As a non-limiting example, a side window of the autonomous vehicle 100 may be implemented as the display 110.

In a non-limiting example as illustrated in FIG. 7, the display 110 may be at least a portion of a rear window of the autonomous vehicle 100. The autonomous vehicle 100 may use the rear window as the display 110 to notify acquired outside situation data to an external vehicle that is travelling behind, or in close proximity to, the autonomous vehicle 100. Accordingly, the external vehicle behind, or in close proximity to, the autonomous vehicle 100, may acquire event information associated with the autonomous vehicle 100 or a vehicle travelling in front of the autonomous vehicle 100 in a threshold distance from the autonomous vehicle 100 based on information displayed on the display 110, even when a front view is obscured by a vehicle travelling ahead of the autonomous vehicle 100.

The display 110 may also be located in at least a portion of a windshield of the autonomous vehicle 100. A driver of a vehicle may need to know a speed change or a direction change of a rear vehicle that occurs during a driving process in some cases. When the display 110 is provided on the windshield in addition to the rear window of the autonomous vehicle 100, a driver of a vehicle in front of the autonomous vehicle 100 may acquire event information associated with the autonomous vehicle 100 or an external vehicle, for example, a vehicle travelling behind the autonomous vehicle 100 via a rear-view mirror of the external vehicle. In a non-limiting example, the display on the windshield of the autonomous vehicle 100 may only be visible to a driver of the external vehicle in front of the autonomous vehicle, and may not be visible to the driver of the autonomous vehicle 100.

A driver of the autonomous vehicle 100 should have clear access to a front view of the autonomous vehicle 100 in order to verify a presence of an obstacle (for example, a rock, a puddle, an animal carcass, and a damaged road) that may not be detected by the sensor 120, and that may only be detected with human eyes. When the entire area of the windshield of the autonomous vehicle 100 is used as the display 110, it may be difficult for the driver of the autonomous vehicle 100 to have clear access to the front view of the autonomous vehicle 100. Thus, a portion of the windshield facing a passenger seat may be used as the display 110.

In the example of FIG. 7, at least a portion 113 of the windshield that faces a passenger seat of the autonomous vehicle 100 may be used as the display 110. By using the portion 113 of the windshield of the autonomous vehicle 100 as the display 110, the driver of the autonomous vehicle 100 may have a clear view of the front of the vehicle 100. For brevity, FIG. 7 illustrates the portion 113 of the windshield facing the passenger seat in a right portion of the autonomous vehicle 100. When a driver seat is in a right portion of a vehicle and a passenger seat is in a left portion of the vehicle, a local map is displayed on a portion of a windshield facing the passenger seat in the left portion of the vehicle.

FIG. 8 illustrates an example of an autonomous vehicle 100.

The autonomous vehicle 100 may include the display 110, the sensor 120 configured to acquire outside situation data, and the processor 130 configured to generate, based on the outside situation data, a local map including the autonomous vehicle 100, an external vehicle in a threshold distance from the autonomous vehicle 100, and a road on which the autonomous vehicle 100 is travelling and control the autonomous vehicle 100 to display the local map on the display 110 of the autonomous vehicle 100.

As a non-limiting example, the sensor 120 may include any one or any combination of a camera, a RADAR, a LIDAR, an ultrasonic sensor, and a GPS sensor. The display 110 may be at least a portion of a rear window of the autonomous vehicle 100, but is not limited thereto. In addition, the display 110 may be provided in at least a portion of a windshield of the autonomous vehicle 100. Also, the display 110 may be at least a portion of the windshield that faces a front passenger seat.

The processor 130 may control the autonomous vehicle 100 to additionally display event information corresponding to any one or any combination of direction changes and speeds of the external vehicle and the autonomous vehicle 100. The event information is mapped to any one or any combination of a digit, a character, and a symbol to be displayed.

The autonomous vehicles, autonomous vehicle 100, display 110, the sensor 120, the processor 130 and other apparatuses, devices, and other components described herein are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of acquiring outside situation information. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A processor implemented method of providing driving information of an autonomous vehicle, the method comprising:
    acquiring situation data of the autonomous vehicle, the situation data of the autonomous vehicle comprising a position of the autonomous vehicle, a speed of the autonomous vehicle, and a direction of travel of the autonomous vehicle;
    generating, based on the situation data, a local map comprising the autonomous vehicle, an external vehicle within a threshold distance from the autonomous vehicle, and a road on which the autonomous vehicle and the external vehicle are travelling;
    determining event information of at least one of a change in direction of the autonomous vehicle that will occur and a change in the speed of the autonomous vehicle that will occur, based on a route of the autonomous vehicle traveling on the road; and
    displaying the local map and an indication of the event information on the local map on a display of the autonomous vehicle visible to a driver of the external vehicle to indicate the at least one of the change in direction of the autonomous vehicle that will occur and the change in the speed of the autonomous vehicle that will occur, to the driver of the external vehicle.

2. The method of claim 1, further comprising:
    acquiring external situation data of the external vehicle, the external situation data of the external vehicle comprising an external position of the external vehicle, an external speed of the external vehicle, and an external direction of travel of the external vehicle,
    wherein the displaying comprises displaying at least one of a current speed of the autonomous vehicle and an external current speed of the external vehicle on the local map.

3. The method of claim 2, wherein the event information comprises any one or any combination of a digit, a character, and a symbol.

4. The method of claim 1, wherein the display of the autonomous vehicle is provided in at least a portion of a rear window of the autonomous vehicle.

5. The method of claim 4, wherein the display of the autonomous vehicle is provided in at least a portion of a windshield of the autonomous vehicle.

6. The method of claim 5, wherein at least a portion of the display of the autonomous vehicle provided in the portion of the windshield of the autonomous vehicle faces a passenger seat of the autonomous vehicle.

7. The method of claim 1, wherein the acquiring the situation data comprises acquiring the situation data using a sensor of the autonomous vehicle, and
    wherein the sensor comprises any one or any combination of a camera, a radio detection and ranging (RADAR), a light detection and ranging (LIDAR), an ultrasonic sensor, and a global positioning system (GPS) sensor.

8. A non-transitory computer-readable storage medium storing instructions that, when executed by a processor, cause the processor to perform the method of claim 1.

9. An autonomous vehicle comprising:
    a display visible to a driver of an external vehicle within a threshold distance from the autonomous vehicle;
    a sensor configured to acquire situation data of the autonomous vehicle, the situation data of the autonomous vehicle comprising a position of the autonomous vehicle, a speed of the autonomous vehicle, and a direction of travel of the autonomous vehicle; and
    a processor configured to:
        generate, based on the situation data, a local map comprising the autonomous vehicle, the external vehicle, and a road on which the autonomous vehicle and the external vehicle are travelling,
        determine event information of at least one of a change in direction of the autonomous vehicle that will occur and a change in the speed of the autonomous vehicle that will occur, based on a route of the autonomous vehicle traveling on the road, and
        control the display to display the local map and an indication of the event information on the local map on the display of the autonomous vehicle visible to the driver of the external vehicle to indicate the at least one of the change in direction of the autonomous vehicle that will occur and the change in the speed of the autonomous vehicle that will occur, to the driver of the external vehicle.

10. The autonomous vehicle of claim 9, wherein the sensor acquires external situation data of the external vehicle, the external situation data comprising a position of the external vehicle, a speed of the external vehicle, and a direction of travel of the external vehicle, and
    wherein the processor is configured to control the display to display at least one of a current speed of the autonomous vehicle and an external current speed of the external vehicle on the local map.

11. The autonomous vehicle of claim 10, wherein the event information comprises any one or any combination of a digit, a character, and a symbol.

12. The autonomous vehicle of claim 9, wherein the display of the autonomous vehicle is provided in at least a portion of a rear window of the autonomous vehicle.

13. The autonomous vehicle of claim 12, wherein the display of the autonomous vehicle is provided in at least a portion of a windshield of the autonomous vehicle.

14. The autonomous vehicle of claim 13, wherein at least a portion of the display of the autonomous vehicle provided in the portion of the windshield of the autonomous vehicle faces a passenger seat of the autonomous vehicle.

15. The autonomous vehicle of claim 9, wherein the sensor comprises any one or any combination of a camera, a radio detection and ranging (RADAR), a light detection and ranging (LIDAR), an ultrasonic sensor, and a global positioning system (GPS) sensor.

16. The autonomous vehicle of claim 9, wherein the display is located in one or more of a windshield, a side window, and a rear window of the autonomous vehicle.

* * * * *